United States Patent
Cooper et al.

(10) Patent No.: US 7,811,711 B2
(45) Date of Patent: Oct. 12, 2010

(54) AEROGEL AND XEROGEL COMPOSITES FOR USE AS CARBON ANODES

(75) Inventors: John F. Cooper, Oakland, CA (US);
Thomas M. Tillotson, Tracy, CA (US);
Lawrence W. Hrubesh, Pleasanton, CA (US)

(73) Assignee: Lawrennce Livermore National Security, LLC, Livermore, CA (US)

( * ) Notice: Subject to any disclaimer, the term of this patent is extended or adjusted under 35 U.S.C. 154(b) by 22 days.

(21) Appl. No.: 12/118,571

(22) Filed: May 9, 2008

(65) Prior Publication Data

US 2009/0017339 A1  Jan. 15, 2009

Related U.S. Application Data

(63) Continuation of application No. 10/810,477, filed on Mar. 26, 2004, now Pat. No. 7,410,718, which is a continuation-in-part of application No. 10/676,532, filed on Sep. 30, 2003, now Pat. No. 7,261,804.

(51) Int. Cl.
*H01M 4/88* (2006.01)
*H01M 8/14* (2006.01)

(52) U.S. Cl. .................. 429/416; 429/408; 429/472; 429/476; 429/523; 502/101

(58) Field of Classification Search .................. None
See application file for complete search history.

(56) References Cited

U.S. PATENT DOCUMENTS 4,041,116 A * 8/1977 Baud et al. .................. 264/29.5
5,476,878 A * 12/1995 Pekala ........................... 521/61
2004/0029982 A1* 2/2004 Erkey et al. .................... 516/98
2004/0132845 A1* 7/2004 Rhine et al. .................... 521/82

OTHER PUBLICATIONS

"Planar fibre reinforced carbon aerogel for application in PEM fuel cells", Carbon, vol. 39, No. 6, May 2001, p. 857-867.*

* cited by examiner

*Primary Examiner*—Jonathan Crepeau
*Assistant Examiner*—Tony Chuo
(74) *Attorney, Agent, or Firm*—John H. Lee; James S. Tak

(57) ABSTRACT

A method for forming a reinforced rigid anode monolith and fuel and product of such method. The method includes providing a solution of organic aerogel or xerogel precursors including at least one of a phenolic resin, phenol (hydroxybenzene), resorcinol(1,3-dihydroxybenzene), or catechol(1,2-dihydroxybenzene); at least one aldehyde compound selected from the group consisting of formaldehyde, acetaldehyde, and furfuraldehyde; and an alkali carbonate or phosphoric acid catalyst; adding internal reinforcement materials comprising carbon to said precursor solution to form a precursor mixture; gelling said precursor mixture to form a composite gel; drying said composite gel; and pyrolyzing said composite gel to form a wettable aerogel/carbon composite or a wettable xerogel/carbon composite, wherein said composites comprise chars and said internal reinforcement materials, and wherein said composite is suitable for use as an anode with the chars being fuel capable of being combusted in a molten salt electrochemical fuel cell in the range from 500 C to 800 C to produce electrical energy. Additional methods and systems/compositions are also provided.

9 Claims, 1 Drawing Sheet

AEROGEL AND XEROGEL COMPOSITES FOR USE AS CARBON ANODES

RELATED APPLICATIONS

This application is a Continuation of U.S. application Ser. No. 10/810,477 filed Mar. 26, 2004, now U.S. Pat. No. 7,410,718, entitled "Aerogel and Xerogel Composites for Use as Carbon Anodes," which is a Continuation In Part of U.S. application Ser. No. 10/676,532 filed Sep. 30, 2003, now U.S. Pat. No. 7,261,804, entitled "Graphitized-Carbon Fiber/Carbon Char Fuel, "which are both incorporated by reference.

The United States Government has rights in this invention pursuant to Contract No. W-7405-ENG-48 between the United States Department of Energy and the University of California for the operation of Lawrence Livermore National Laboratory.

BACKGROUND

High temperature, molten electrolyte, electrochemical cells have been shown to be an efficient method of producing energy particularly when the fuel source is hydrogen gas. Carbon as a fuel source in electrochemical cells has been explored.

SUMMARY OF THE INVENTION

An aspect of the invention includes A carbon anode produced by the process comprising: providing a solution of organic aerogel or xerogel precursors including at least one of a phenolic resin, phenol (hydroxybenzene), resorcinol (1,3-dihydroxybenzene), or catechol (1,2-dihydroxybenzene) and at least one aldehyde compound selected from the group consisting of formaldehyde, acetaldehyde, furfuraldehyde; adding (1) ceramic materials; (2) glassy materials based on borates, phosphates, or silicates with alkaline earth or transition metal cations; and/or (3) carbon materials to the precursor solution to form a precursor mixture; gelling the precursor mixture to form a composite gel; drying the composite gel; and pyrolyzing the composite gel to form an aerogel/carbon composite or a xerogel/carbon composite. Another embodiment provides a method for forming a reinforced rigid anode monolith and fuel and product of such method. The method includes providing a solution of organic aerogel or xerogel precursors including at least one of a phenolic resin, phenol (hydroxybenzene), resorcinol(1,3-dihydroxybenzene), or catechol(1,2-dihydroxybenzene); at least one aldehyde compound selected from the group consisting of formaldehyde, acetaldehyde, and furfuraldehyde; and an alkali carbonate or phosphoric acid catalyst; adding internal reinforcement materials comprising carbon to said precursor solution to form a precursor mixture; gelling said precursor mixture to form a composite gel; drying said composite gel; and pyrolyzing said composite gel to form a wettable aerogel/carbon composite or a wettable xerogel/carbon composite, wherein said composites comprise chars and said internal reinforcement materials, and wherein said composite is suitable for use as an anode with the chars being fuel capable of being combusted in a molten salt electrochemical fuel cell in the range from 500 C to 800 C to produce electrical energy. Another embodiment provides a method for producing a reinforced xerogel/carbon composite, and resulting composite. The method includes providing a solution of organic xerogel precursors including at least one of a phenolic resin, phenol (hydroxybenzene), resorcinol(1,3-dihydroxybenzene), or catechol(1,2-dihydroxybenzene); and at least one aldehyde compound; adding internal reinforcement materials selected from (1) ceramic materials; (2) glassy materials based on borates, phosphates, or silicates with alkaline earth or transition metal cations; and/or (3) carbon materials to said precursor solution to form a precursor mixture; gelling said precursor mixture to form a composite gel; drying said composite gel; and pyrolyzing said composite gel to form a xerogel/carbon composite comprising chars and the internal reinforcement materials, wherein said chars are fuel capable of being combusted in a molten salt electrochemical fuel cell to produce electrical energy. A method for producing a reinforced rigid anode monolith and fuel in another embodiment comprises providing a solution of organic aerogel or xerogel precursors including at least one of a phenolic resin, phenol (hydroxybenzene), resorcinol(1,3-dihydroxybenzene), or catechol(1,2-dihydroxybenzene); at least one aldehyde compound selected from the group consisting of formaldehyde, acetaldehyde, and furfuraldehyde; and a transition metal oxide catalyst; adding internal reinforcement materials selected from (1) ceramic materials; (2) glassy materials based on borates, phosphates, or silicates with alkaline earth or transition metal cations; and/or (3) carbon materials to said precursor solution to form a precursor mixture; gelling said precursor mixture to form a composite gel; drying said composite gel; and pyrolyzing said composite gel to form an aerogel/carbon composite or a xerogel/carbon composite wherein said composites comprise chars and said internal reinforcement materials, and said chars are fuel capable of being combusted in a molten salt electrochemical fuel cell in the range from 500 C to 800 C to produce electrical energy. Additional methods and systems/compositions are also provided.

DETAILED DESCRIPTION

Figure 1:
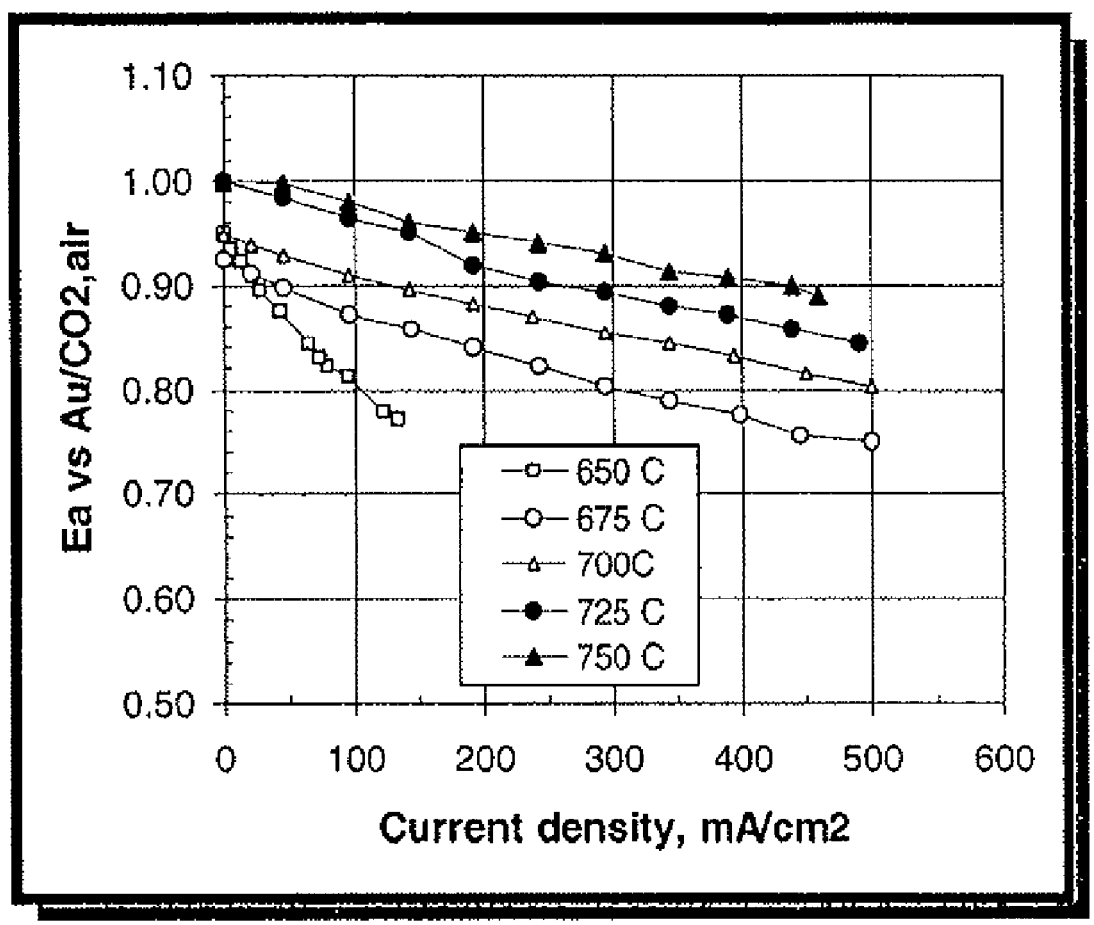
FIGURE 1 shows the potential contributed by the carbon anode measured against a reference electrode (Au/$CO_2$, air) vs. current density (mA/$cm^2$).

A process has been developed to separate and recover the graphite fibers from carbon composite materials. The same process can be used to convert a variety of carbon based materials such as, biomass or agricultural clippings, sawdust, petroleum pitch, coal tar pitch, petroleum tar and pitch, peat, tar derived from tar sands, low rank coals, into fuel. The mixture of carbon material and graphite fibers is first pyrolyzed to create a plurality of carbon chars that are bound to graphite fibers. The plurality of carbon chars that are bound to graphite fibers resulting from the pyrolysis step are then subjected to anodic oxidation at temperatures from 500-800° C. in a molten salt electrochemical fuel cell, such as the high temperature molten salt electrochemical cells described in pending U.S. application Ser. No. 10/170,879, filed Jun. 12, 2002, titled "Tilted Fuel Cell Apparatus" and assigned to the same assignee is suitable for carrying out the present invention. The carbon chars are preferentially removed form the graphite fibers, leaving the graphite fibers intact.

Some carbon composites, such as those used in the manufacture of automobiles, represent a large waste stream of graphitized-carbon fibers encased in polymers, e.g., epoxy and plastic materials. Pyrolyzing these carbon composites produces a plurality of carbon chars that are bound to graphite fibers. A fuel source can be created by mixing plastic materials with graphite fibers and then pyrolyzing the mixture. Pyrolyzing plastics (i.e., heating at temperatures from 400° C. to 600° C. under a non-oxidizing atmosphere) causes the plastics to thermally decompose and produce carbon chars. Pyrolysis begins at about 350 and is very rapid above 600 C. There is an inverse dependence of charring time on temperature. When the plastic materials thermally decompose to carbon chars, they attach to the graphite fibers to produce a plurality of carbon chars bound to graphite fibers. Graphite fibers are high-tensile fibers or whiskers made from either (1) rayon, (2) polyacrylonitrile, or (3) petroleum pitch. Binding the carbon chars to the graphite fibers creates a large surface area in which the carbon chars are in contact with the fibers. The graphite fibers serve to increase anodic dissolution efficiency by providing electronic conductivity. Thus a large surface area increases the transfer of electrons from the carbon char undergoing oxidation through the graphite fibers to the current collector.

The pyrolysis may be accelerated by using transition metal oxides. The molten salt can serve as both a thermal medium for supporting pyrolysis and as an electrolyte in the subsequent electrolysis step. Various molten salts can be used, including mixtures of molten alkali or alkaline earth carbonates, halide salts, or salts based on cryolyte ($Na_3AlF_6$). The electrolysis step frees the graphite fibers, which are not readily electrochemically oxidized under conditions resulting in the quantitative oxidation of carbon chars. Graphite and highly graphitized or glassy carbon materials are less reactive than carbon chars by up to four orders of magnitude. The anodic half reaction of the carbon char resulting in carbon dissolution in carbonate is:

$$C+2CO_3^{2-}=3CO_2+4e^-; \text{ and}$$

the cathodic half reaction in carbonate is oxygen reduction at an inert electrode (e.g., Ni/NiO):

$$O_2+2CO_2+4e^-=2CO_3^{2-}.$$

The net reaction is the same as the combustion of the char: $C+O_2=CO_2$. The half reactions listed above are the same as those of a carbon/oxygen fuel cell, and would occur with a low potential (electrolysis mode) or with a net production of electrical energy (galvanic mode, negative process energy cost). An inert or glassy carbon cathode would promote reduction of the carbonate melt to CO.

The local temperature increases of the graphite fibers are controllable in a molten salt environment, which prevents the fibers from combusting along with the carbon materials. Because of ability to control the temperature in the molten salt, the more reactive carbon chars are preferentially oxidized under conditions that leave the graphite fibers intact. It is also possible to sparge air through the molten salt and promote oxidation of the chars selectively, but this process is likely to be diffusion controlled and slow compared to the electrochemical oxidation just described.

In addition to separating and recovering the graphite fibers from carbon composite materials, pyrolized polymeric materials in composites with carbon fibers can be fabricated for use as carbon anodes in batteries and fuel cells. Pyrolysis of polymeric materials in composites with carbon fibers provides mechanical strength and a means for current collection when used in carbon/air fuel cells and batteries.

The carbon/air fuel cell may use plates, large spheres, cylinders or other large (1-1000 mm) rigid anode structures produced by pyrolysis of various polymeric materials to form rigid bodies of porous carbon. The use of such rigid materials allows constraint of the reaction of the anode to a thin layer opposite the separator and cathode assembly. The reaction and passage of current allows polarization of the anode (0.05-0.2 V overpotential) that shuts off the Boudouard corrosion that would otherwise occur on an unpolarized anode exposed to an overflow of $CO_2$ according to the reaction, $$C+CO_2=2\ CO.$$

Anodes may also be produced by premixing the aerogel or xerogel precursors with ceramic materials. The resulting mixture is then gelled and pyrolyzed to form composite materials suitable for use as carbon anodes. The addition of ceramic materials offer internal support to the carbon anode. Examples of effective ceramic materials include silica, alumino-silicates, ash derived from coal or petroleum clays, or glassy materials based on borates, phosphates, or silicates with alkaline earth or transition metal cations.

In addition to aerogel and xerogel composites, pyrolyzed aerogels and pyrolyzed xerogels can be used alone as carbon anodes. These materials are particularly useful as rigid block anodes in carbon/air fuel cells and batteries.

EXAMPLES

Example 1

Phenolic-furfural Carbon Aerogel

An organic gel solution was prepared from a commercially available polymer solution (FurCarb UP520; QO Chemicals, Inc., West Lafayette, Ind., USA). This solution comprised approximately a 50:50 mixture of a phenolic novolak resin dissolved in furfuraldehyde. The FurCarb UP520 was diluted 50 wt. % with 1-propanol and 1 gr of phosphoric acid catalyst is added (a mixture of aromatic acid chlorides; Q2001; QO Chemicals, Inc.: West Lafayette, Ind., USA). The solution was poured into glass vials, sealed and cured for 7 days at 85° C. The gels were removed from the vials and placed directly into a pressure vessel. The gels were then dried by supercritical extraction after exchange with liquid carbon dioxide in the pressure vessel at about 70 bars and 40° C. temperature for 6 hours. The dried gels were then heated in a furnace, under nitrogen flow, to a temperature of 1050° C. over about 70 minutes, maintained at 1050° C. for 4 hours, and then cooled at a rate of about 10° C./minute to form glassy-carbon monoliths.

Example 2

Monolithic Aerogel/Xerogel

An organic gel solution comprising 12.4 grams of resorcinol, 17.9 grams of 37% formaldehyde solution, 22.3 grams of 0.1 molar sodium carbonate and 45.3 grams of de-ionized water, is mixed and poured into a glass container. The container is sealed and then placed in an oven at a temperature of 80° C.; gelation occurs in about 120 minutes.

For an aerogel, the gel is removed from the glass container and placed in a stirred, acetone solvent bath for 24 hours. The gel is removed from the solvent bath and immediately placed in an acetone filled pressure vessel. The gel is dried by supercritical extraction after exchange of the acetone solvent with liquid carbon dioxide in the pressure vessel at about 60 bars and 40° C. temperature for 6 hours. The dried aerogel is then heated in a furnace to a temperature of 900° C. over about 60 minutes, maintained at 900° C. for 12 hours, and then cooled at a rate of about 10° C./minute to form a glassy-carbon monolith.

For a xerogel, the gel remains in the glass container which is partially sealed by placing a gas-permeable membrane over its opening. The gel slowly dries and shrinks over a period of about 40 days. The dried xerogel is then heated in a furnace to a temperature of 900° C. over about 60 minutes, maintained at 900° C. for 12 hours, and then cooled at a rate of about 10° C./minute to form a glassy-carbon monolith.

Example 3

Aerogel/Carbon Pre-form Composite

An organic gel solution comprising 12.4 grams of resorcinol, 17.9 grams of 37% formaldehyde solution, 22.3 grams of 0.1 molar sodium carbonate and 45.3 grams of de-ionized water, is infiltrated into a preformed carbon fiber mat in a glass container; extra solution is added to completely cover the mat. The container is then placed in an oven at a temperature of 80° C.; gelation occurs in about 120 minutes. The composite gel is removed from the container and placed in an acetone solvent bath for 24 hours. The composite gel is then dried by super-critical extraction after exchange with liquid carbon dioxide in a pressure vessel at about 60 bars and 40° C. temperature for 6 hours. The dried composite is then heated in a furnace to a temperature of 900° C. over about 60 minutes, maintained at 900° C. for 12 hours, and then cooled at a rate of about 10° C./minute to form a glassy-carbon composite monolith.

Example 4

Aerogel/Carbon Fiber Composite

An organic gel solution comprising 12.4 grams of resorcinol, 17.9 grams of 37% formaldehyde solution, 22.3 grams of 0.1 molar sodium carbonate and 45.3 grams of de-ionized water, is mixed with 43 grams of carbon fibers in a 200 ml beaker. The beaker is placed in an ultrasonic water bath heated to 65° C. and sonicated at high intensity; gelation occurs in 150 minutes. The gel is placed in an oven at 80° C. for about 30 hours. The composite gel is cooled and removed from the beaker and placed in an acetone solvent bath for 24 hours. The composite gel is then dried by super-critical extraction after exchange with liquid carbon dioxide in a pressure vessel at about 60 bars pressure and 40° C. temperature for 6 hours. The dried composite is then heated in a furnace to a temperature of 1050° C. over about 70 minutes, maintained at 1050° C. for a 12 hours, and then cooled at a rate of about 10° C./minute to form a glassy-carbon composite monolith is formed.

Those skilled in the art can vary the above-listed examples using other organic gel precursors, other carbon-fiber mats or foams, and/or other carbon fiber varieties or particles, such as carbon fibers, carbon paper, carbon rods, carbon fabrics, carbon screens, and graphite or highly graphitized carbon structures to form aerogels and aerogel composites with desired characteristics, For instance, in example 2 above, catechol can readily be substituted for resorcinol, in example 3 other phenolic "novolak" resins may be substituted for FurCarb UP520, in all cases acetaldehyde may be substituted for formaldehyde, and alcohol solvents may be substituted for acetone.

The strengths of the composites are significantly higher than the xerogel or aerogel material because the pre-formed carbon and carbon fibers provide reinforcement to the xerogel/aerogel structure, Table 1 compares the compressive moduli of the three types of monoliths formed in the above-listed examples. All three samples have approximately the same densities.

TABLE 1

|  | Phenolic-furfural xerogel | Fiber-mat/ xerogel | Fiber/xerogel composite |
|---|---|---|---|
| Density (kg/m³) | | | |
| pre-form (un-loaded) | — | 129 | 243 |
| composite | 578 | 667 | 703 |
| Modulus (MPa) | | | |
| pre-form (un-loaded) | — | 46 | — |
| composite | 335 | 483 | 455 |

Experimental Results

Aerogel samples were tested using a gold electrode half cell. The samples were prepared by polycondensing resorcinol with formaldehyde using $Na_2CO_3$ as a catalyst, dried by $CO_2$ supercritical extraction and pyrolyzed at 1050° C. in a nitrogen environment. The gels had a density of 0.56 g/cm² and a resistivity of 0.04 Ω-cm. Using a separator porous ceramic separator made of zirconia fabric and stainless steel wire cathode at 700° C. the power output associated with the anode was measured at 1 kW/m² at 80% efficiency with a peak power of 4.5 kW/m². Cf power levels may be compared with data for particulate carbon at 800° C. showing peak power below 1 kW/m² despite the 100° C. higher temperature. FIGURE 1 shows the potential contributed by the carbon anode measured against a reference electrode ($Au/CO_2$, air) vs. current density ($mA/cm_2$), By substituting a rigid block anode made of a Xerogel-like material for the particulate carbon anodes, we achieve a significant increase in the power contributed by the anode to a carbon/air cell at a fixed temperature. Even at a 100° C. lower temperature, the peak power capability is significantly increased by a factor of up to four, while the lower temperature of operation is highly favorable. The lower temperature of operation allows one to circumvent difficult materials stability problems encountered at 800° C. Operating temperatures of 650-700° C. allows one-use materials and air electrode structures already fully developed and deployed in the molten carbonate fuel cell (MCFC) industry. Additionally, the use of a rigid block anode prevents percolation of $CO_2$ through the anode's interior and thus protects the interior of the anode from Boudouard corrosion (the reaction, $C+CO_2=2CO$). The surfaces of the rigid block anode not opposite the separator and undergoing oxidation under polarization may be protected from Boudouard corrosion simply by coating with a thin layer of sacrificial ceramic material.

All numbers expressing quantities of ingredients, constituents, reaction conditions, and so forth used in the specification and claims are to be understood as being modified in all instances by the term "about". Notwithstanding that the numerical ranges and parameters setting forth the broad scope of the subject matter presented herein are approximations, the numerical values set forth in the specific examples are reported as precisely as possible. Any numerical value, however, inherently contain certain errors necessarily resulting from the standard deviation found in their respective testing measurements.

While various materials, parameters, operational sequences, etc. have been described to exemplify and teach the principles of this invention, such are not intended to be limited. Modifications and changes may become apparent to those skilled in the art; and it is intended that the invention be limited only by the scope of the appended claims.

What is claimed is:

1. A method for producing a reinforced rigid anode monolith and fuel, the method comprising:

providing a solution of organic aerogel or xerogel precursors including at least one of a phenolic resin, phenol (hydroxybenzene), resorcinol(1, 3-dihydroxybenzene), or catechol(1,2-dihydroxybenzene); at least one aldehyde compound selected from the group consisting of formaldehyde, acetaldehyde, and furfuraldehyde; and a transition metal oxide catalyst;

adding internal reinforcement materials selected from (1) ceramic materials; (2) glassy materials based on borates, phosphates, or silicates with alkaline earth or transition metal cations; and/or (3) carbon materials to said precursor solution to form a precursor mixture;

gelling said precursor mixture to form a composite gel;

drying said composite gel; and pyrolyzing said composite gel to form an aerogel/carbon composite or a xerogel/carbon composite wherein said composites comprise chars and said internal reinforcement materials, and said chars are fuel capable of being combusted in a molten salt electrochemical fuel cell in the range from 500 C to 800 C to produce electrical energy.

2. The method recited in claim 1, wherein said drying is accomplished by supercritical-critical solvent extraction.

3. The method recited in claim 1, wherein said drying is accomplished by air drying.

4. The method recited in claim 1, wherein said ceramic materials arc selected from the group consisting of silica, aluminosilicates, and ash derived from coal or petroleum clays.

5. The method recited in claim 1, wherein said carbon materials are selected from the group consisting of carbon :fibers, carbon paper, carbon rods, carbon fabrics, carbon screens, graphite or highly graphitized carbon structures.

6. The method recited in claim 1 wherein said composites have a density of at least 0.56 grams/cm$^3$.

7. The method recited in claim 6 wherein said carbon materials comprise graphite.

8. The method recited in claim 1 wherein the pyrolizing is conducted in the presence of a material selected from the group consisting of alkali carbonate, alkaline earth carbonate or phosphoric acid, halide salts, and salts based on sodium aluminum hexafluoride.

9. The method recited in claim 1, wherein pyrolyzing said composite gel forms a wettable aerogel/carbon composite or a wettable xerogel/carbon composite.

* * * * *